R. C. BEHRENDS.
SPRING WHEEL.
APPLICATION FILED JAN. 2, 1912.
1,074,235.
Patented Sept. 30, 1913.
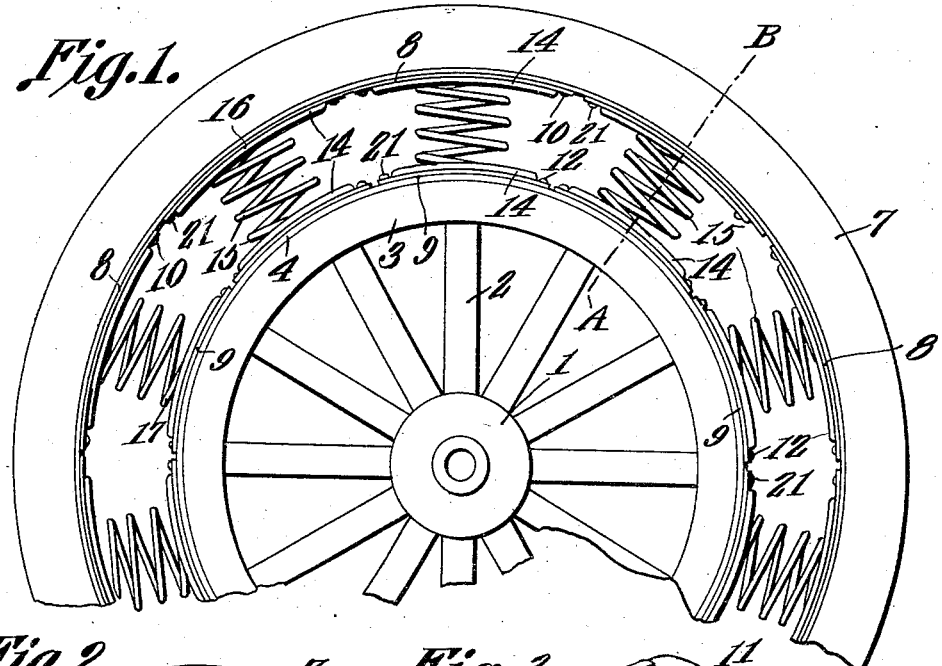
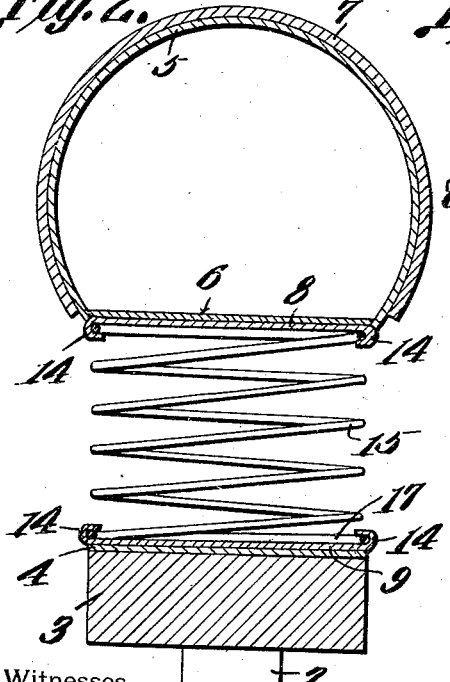
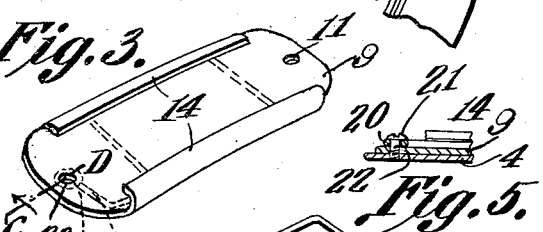
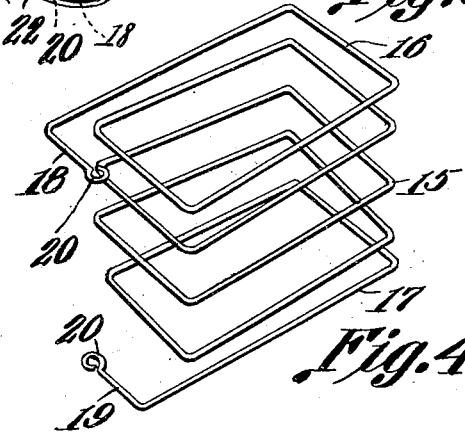
R. C. Behrends,
Inventor

UNITED STATES PATENT OFFICE.

RODDIE C. BEHRENDS, OF EASTON, ILLINOIS.

SPRING-WHEEL.

1,074,235.	Specification of Letters Patent.	Patented Sept. 30, 1913.

Application filed January 2, 1912. Serial No. 669,063.

*To all whom it may concern:*

Be it known that I, RODDIE C. BEHRENDS, a citizen of the United States, residing at Easton, in the county of Mason and State of Illinois, have invented a new and useful Spring-Wheel, of which the following is a specification.

The present invention aims to provide a wheel structure in which the commonly used pneumatic tires are replaced by a puncture-proof tube, preferably fashioned from metal, and ordinarily inelastic, the resiliency of the wheel being afforded by means of springs which are interposed between the rim and the tire of which the tube constitutes a part.

A further object of the invention is to provide novel means for connecting the supporting springs with the rim and with the tire.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in fragmental side elevation; Fig. 2 is a radial section upon the line A—B of Fig. 1; Fig. 3 is a perspective of one of the spring holders; Fig. 4 is a perspective of one of the springs; and Fig. 5 is a section upon the line C—D of Fig. 3, a portion of one of the springs, and a portion of the rim being shown as added details.

In the accompanying drawings, the numeral 1 denotes the hub, and the numeral 2 denotes the spokes, the spokes 2 supporting the rim, which is a composite structure, the rim including a felly 3 and a felly band 4, surrounding the felly. Yieldably supported upon the rim, and spaced therefrom, is the tire which, like the rim, is a composite structure. The tire includes an inner tube 5, having a base 6, and a cover 7 surrounding the inner tube 5. The inner tube 5 and its base 6 are preferably fashioned from steel, this portion of the structure, therefore, being puncture-proof and inelastic. The cover 7 is ordinarily fashioned from rubber, leather, canvas or the like. It adds little, if any resiliency to the structure, and is not relied upon to effect this end. Its principal function is to render the wheel noiseless in operation.

The springs which serve to hold the tire yieldably spaced beneath the rim, may be assembled with the tire and with the rim in any desired manner. In the present instance, spring holders are applied to the band 4 and to base 6 of the inner tube 5. One of these spring holders is shown in Fig. 3. The spring holders are substantially alike, but for convenience in description, those holders which are connected with the base 6 will be denoted by the numeral 8, those holders which are connected with the felly band 4 being denoted by the numeral 9. Each holder, then, is in the form of a plate, and pivot elements 10 are extended through openings 11 in the holders 8, to unite the holders 8 at one end with the base 6 of the tube 5. Other pivot elements 12 enter the corresponding openings 11 in the holders 9, to assemble the holders 9 pivotally with the felly band 4. The lateral edges of the holders are equipped with inwardly projecting, overhanging flanges 14.

The springs, denoted generally by the numeral 15, are preferably of helical form, the convolutions thereof being rectangular. The outer convolution 16 of the spring 15 is engaged beneath the flanges 14 of the holder 8, the inner convolution 17 being engaged beneath the flanges 14 of the holder 9. The convolutions 16 and 17 terminate at their free ends in angularly disposed fingers 18 and 19, respectively, the fingers being terminally equipped with eyes 20. Securing elements 21, preferably taking the form of screw bolts, are passed through the eyes 20, and through openings 22 in the holders 8 and 9, the securing elements 21 entering the base 6 of the tube 5, and entering the felly band 4, as will be clearly appreciated from an inspection of Fig. 5.

Noting Fig. 1 it will be seen that when the vehicle wheel moves over the ground, the springs at the bottom of the wheel will be compressed, the springs at the top of the wheel being elongated. The tire will, therefore, be yieldingly and resiliently supported. Owing to the rectangular form given to the convolutions of the springs 15, the springs will afford the desired vertical resiliency, without permitting the tire to have an undesirable amount of lateral movement with respect to the rim.

When it is desired to remove one of the springs 15, the securing elements 21 are disengaged from the felly band 4 and from the base 6 of the inner tube 5, whereupon the holders 8 and 9 may be swung outwardly, at their free ends, the holders moving upon pivot elements 10 and 12 as centers. It is to be noted that when the securing elements 21 are disengaged from the base 6 of the inner tube, and from the felly band 4, the free ends of the convolutions 16 and 17 are set free, since the securing elements 21 no longer engage in the eyes 20. The springs 15 may thereupon be slid endwise, from beneath the flanges 14.

In replacing a spring, the convolutions 16 and 17 are engaged beneath the flanges 14, the eyes 20 being alined with the openings 22. The holders 8 and 9 are then swung inwardly to the plane of the wheel, and the securing elements 21 are passed through the eyes 20, and through the openings 22, into engagement with the felly band 4 upon the one hand, and into engagement with the base 6 of the inner tube, upon the other hand. The construction, therefore, is such that not only is the tire yieldably spaced from the rim, but, as well, any one of the springs 15 may readily be replaced, without disturbing the relative positions between the tire and the rim, and without disturbing the relative positions between the tire, the rim, and the remaining springs 15.

Owing to the fact that the inner tube 5 is puncture-proof, and owing to the fact that the resiliency of the structure is afforded by the springs 15, the device may be used upon the roughest roads, without danger of injury through puncture, and without danger to the running gear, due to excessive jolting.

Having thus described the invention, what is claimed is:—

1. In a device of the class described, a rim; a tire; holders mounted upon the rim and upon the tire for lateral swinging movement, thereby to dispose the holders transversely of the tire and of the rim; a spring adapted to be assembled with the holders and be removed therefrom when the holders are disposed transversely of the tire and of the rim, the holders having spring engaging elements for receiving the spring slidably; and means for securing the holders against swinging movement and in alinement with the rim and with the tire.

2. In a device of the class described, a tire; a rim; holders mounted upon the tire and upon the rim to swing transversely of the tire and of the rim; springs engaging the holders and removable therefrom when the holders are disposed transversely of the tire and of the rim; spaced elements connecting the holders with the tire and with the rim respectively, one connection element of each holder constituting a pivotal mounting for the holder, and the other connecting element of each holder constituting means for securing said holder against swinging movement, the last specified connecting element of each holder being engaged with the spring to prevent relative movement between the spring and said holder.

In testimony that I claim the foregoing as my own, I have hereto affixed my signature in the presence of two witnesses.

RODDIE C. BEHRENDS.

Witnesses:
JOHN CUNINGHAM,
HENRY HEBERLING.

Copies of this patent may be obtained for five cents each, by addressing the "Commissioner of Patents, Washington, D. C."